Aug. 12, 1941.　　　　G. BOULET　　　　2,252,480
HIGH SPEED INTERNAL COMBUSTION ENGINE
Filed Feb. 18, 1937

Inventor,
Georges Boulet
Hascock Downing & Seebold
By:　　　　Attorneys.

Patented Aug. 12, 1941

2,252,480

UNITED STATES PATENT OFFICE 2,252,480

HIGH SPEED INTERNAL COMBUSTION ENGINE

Georges Boulet, Plessis-Robinson, France

Application February 18, 1937, Serial No. 126,461
In France February 25, 1936

5 Claims. (Cl. 74—595)

The present invention relates to high speed internal combustion engines, and its primary object is to provide engines the operation of which will not be disturbed by the bending, twisting or longitudinal vibrations of the crankshaft.

It is known that the vibration frequency is proportional to the square root of the rigidity. The rigidity, as regards the bending vibrations of a crankshaft, is inversely proportional to the cube of the length of the crankshaft. It will therefore be seen that considerable interest is offered by a reduction of the length of the crankshaft. This is obtained, according to the present invention, by associating with any number of actuating cylinders a plurality of coaxial elementary crankshafts coupled to each other end to end by means of flutes or grooves with the interposition of at least one intermediate part or any other system securing the elementary crankshafts to each other as regards the forces to be transmitted in planes which are perpendicular to the axis of rotation but leaving them independent as regards the forces located in a plane passing through the axis of rotation. Such a coupling can be obtained for example by means of splined ends for the shafts having a slight radial and peripheral play, forming what is known as a floating coupling.

When the power is to be transmitted to a countershaft, the transmission is advantageously effected at the point of junction of two contiguous elementary crankshafts, for example by means of a gear wheel connected by a floating coupling with the end of each crankshaft, or mounted on the coupling member of the crankshafts or again mounted on the ends of the two crankshafts and floatingly securing them together.

The various features and objects of the invention will be more readily understood upon a consideration of the accompanying drawing and the following description wherein several exemplary embodiments of the invention are disclosed.

Figure 1:
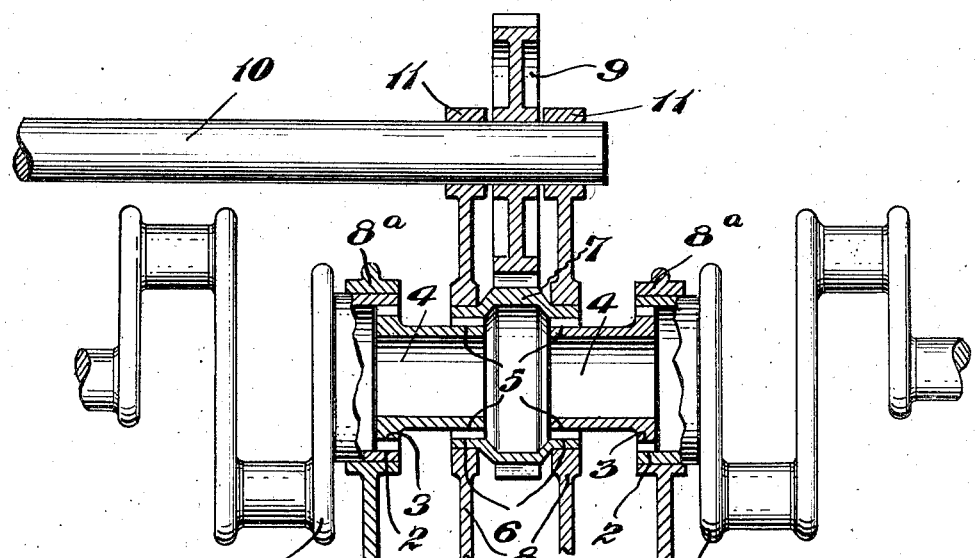
Fig. 1 is an elevational view of two coaxial crankshafts illustrating the coupling therebetween in section.

In the example of Fig. 1 each of the two elementary crankshafts 1 and 1a, arranged coaxially end to end, carries at the end flutes or grooves 2 which are engaged in corresponding flutes or grooves 3 of a short hollow shaft 4. A slight radial and circumferential play is allowed between the flutes 2 and the flutes 3, so as to obtain a floating connection. Each shaft 4 carries at its other end another series of flutes or grooves 5 engaged, again with play, in flutes or grooves 6 on the hub of a hollow pinion or intermediate shaft member 7 carried co-axially with the crankshafts by bearings 8 interposed between the end bearings 8a of the crankshafts. Said pinion 7 meshes with a gear wheel 9 keyed on a large hollow shaft 10 carried by bearings 11.

The grooves or other elements transmitting the power are arranged preferably at the nodal points of the elementary crankshafts and of the connecting members.

The gears 7 and 9 can advantageously form a speed reducer between the crankshaft and the transmission shaft 10.

Each elementary crankshaft 1 and 1a can have any number of crank pins, from one to eight and more, and any number of such elementary crankshafts can be arranged end to end. The crankshaft unit thus formed behaves in a general manner as an integral crankshaft, in particular as regards the setting of the crank pins, the balancing, the order of firing of the cylinders, but as regards the vibrations, each elementary crankshaft behaves as if it were alone and the natural vibration frequency of the whole unit is equal to that of each elementary crankshaft, this being due to the floating connection between the elementary crankshafts, which connection leaves them free from each other with regard to bending and decreases their length with regard to twisting.

Each elementary crankshaft is of course constructed so as to have a natural rigidity which is as high as possible, it will in particular be advantageous to form it of a hollow body obtained by any appropriate means.

The drive of the usual accessories such as a supercharger, magneto, distribution cams, will advantageously be effected from the gear 7. This is made possible in practice by the floating connection, since if the crankshaft unit as a whole were made in one piece or composed of elements rigidly connected to each other, the pinion 7 would be in the middle of the crankshaft, that is to say at the centre of vibration of the fundamental bending period, so that the gear 7 would have a transverse displacement of maximum amplitude which would make a correct meshing with the wheel 9 practically impossible.

Figure 2:
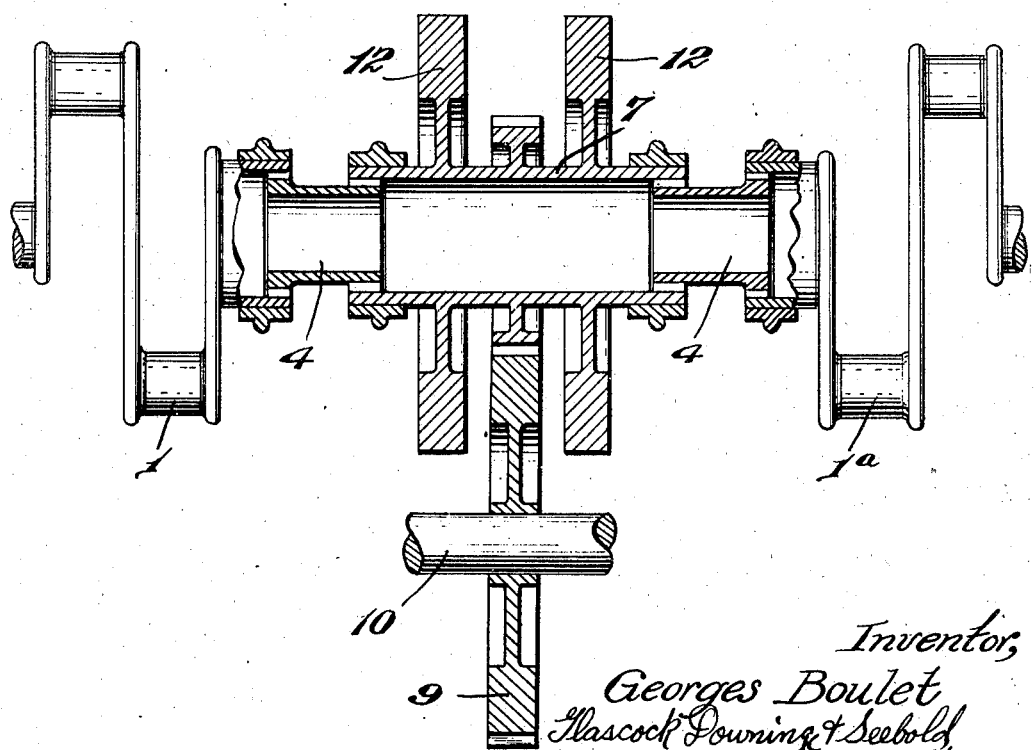
Fig. 2 is a similar sectional view of the coupling means illustrating fly-wheels associated therewith.

In the arrangement of Fig. 2, fly wheels 12 are arranged opposite both faces of the primary gear 7 and the secondary gear 8 has a thick rim which also makes it serve as a fly wheel. This arrangement is only an example of embodiment of the essential arrangement which consists in arranging the inertia member or members effecting the control at the point of the crankshaft from which power is taken off.

What I claim is:

1. In a multi-cylinder engine, including a composite crankshaft comprising a plurality of co-axial elementary crankshafts and coupling means connecting the opposite ends of any two adjacent elementary crankshafts, said coupling means including flutes respectively provided on said opposite crankshaft ends, two short alined shafts between said ends and coaxial to the crankshaft, flutes provided at both ends of each of said shafts, each shaft having one fluted end in axial slidable engagement with the adjacent fluted crankshaft end, an intermediate shaft member provided with flutes in slidable engagement with the opposite fluted ends of both said short shafts, and bearing means for said intermediate shaft member.

2. In a multi-cylinder engine, including a composite crankshaft comprising a plurality of co-axial elementary crankshafts and coupling means connecting the opposite ends of any two adjacent elementary crankshafts, said coupling means including flutes respectively provided on said opposite crankshaft ends, two short alined shafts between said ends and coaxial to the crankshaft, flutes provided at both ends of each of said shafts, each shaft having one fluted end in axial slidable engagement with the adjacent fluted crankshaft end, an intermediate shaft member provided with flutes in slidable engagement with the opposite fluted ends of both said short shafts, bearing means for said intermediate shaft member, and a gear wheel toothing carried by said intermediate shaft member.

3. In a multi-cylinder engine, including a composite crankshaft comprising a plurality of co-axial elementary crankshafts and coupling means connecting the opposite ends of any two adjacent elementary crankshafts, said coupling means including flutes respectively provided on said opposite crankshaft ends, two short alined shafts between said ends and coaxial to the crankshaft, flutes provided at both ends of each of said shafts, each shaft having one fluted end in axial slidable engagement with the adjacent fluted crankshaft end, an intermediate shaft member provided with flutes in slidable engagement with the opposite fluted ends of both said short shafts, bearing means for said intermediate shaft member, a gear wheel toothing carried by said intermediate shaft member, and fly wheels respectively provided on each side of said toothing and carried by said intermediate shaft member.

4. In a multi-cylinder engine, including a composite crankshaft comprising a plurality of co-axial elementary crankshafts and coupling means connecting the opposite ends of any two adjacent elementary crankshafts, said coupling means including flutes respectively provided on said opposite crankshaft ends, two short alined shafts between said ends and coaxial to the crankshaft, flutes provided at both ends of each of said shafts, each shaft having one fluted end in axial slidable engagement with the adjacent fluted crankshaft end, and an intermediate shaft member provided with flutes in slidable engagement with the opposite fluted ends of both said short shafts.

5. In a multi-cylinder engine, including a composite crankshaft comprising a plurality of co-axial elementary crankshafts and coupling means connecting the opposite ends of any two adjacent elementary crankshafts, said coupling means including two short alined shafts between said ends and coaxial to the crankshaft, an intermediate shaft member, bearing means for said intermediate shaft member to support it in coaxial relation with the crankshaft, and floating connections each adapted to allow for minute longitudinal and transverse motion of the connected parts relatively to each other, respectively provided to connect together the adjacent ends of said elementary crankshafts and short connecting shafts and the adjacent ends of said short connecting shafts and intermediate shaft member.

GEORGES BOULET.